(12) United States Patent
Zhang et al.

(10) Patent No.: US 7,547,486 B2
(45) Date of Patent: Jun. 16, 2009

(54) DIRECT METHANOL FUEL CELL

(75) Inventors: Zhengming Zhang, Charlotte, NC (US); Britta Zimmerer, Amorbach (DE); Quan Huang, Obernburg (DE); Oliver Schuster, Schwelm (DE)

(73) Assignee: Celgard LLC, Charlotte, NC (US)

( * ) Notice: Subject to any disclaimer, the term of this patent is extended or adjusted under 35 U.S.C. 154(b) by 906 days.

(21) Appl. No.: 10/974,490

(22) Filed: Oct. 27, 2004

(65) Prior Publication Data
US 2005/0202307 A1  Sep. 15, 2005

Related U.S. Application Data

(63) Continuation-in-part of application No. 10/798,032, filed on Mar. 11, 2004, now abandoned.

(51) Int. Cl.
*H01M 4/94* (2006.01)
*H01M 8/10* (2006.01)

(52) U.S. Cl. .............................. 429/42; 429/30; 429/44
(58) Field of Classification Search .................. 429/30, 429/42, 44
See application file for complete search history.

(56) References Cited

U.S. PATENT DOCUMENTS

| | | | |
|---|---|---|---|
| 3,709,774 A * | 1/1973 | Kimura | ................... 428/310.5 |
| 4,483,694 A | 11/1984 | Takamura et al. | |
| 4,664,681 A | 5/1987 | Anazawa et al. | |
| 5,460,896 A | 10/1995 | Takada et al. | |
| 5,620,807 A | 4/1997 | Mussell et al. | |
| 6,248,476 B1 | 6/2001 | Sun et al. | |
| 6,475,249 B1 | 11/2002 | Hsu et al. | |
| 6,699,611 B2 | 3/2004 | Kim et al. | |
| 6,716,549 B2 | 4/2004 | Bai et al. | |
| 6,733,915 B2 | 5/2004 | Barton et al. | |
| 6,960,403 B2 | 11/2005 | Morse et al. | |
| 2002/0192537 A1 | 12/2002 | Ren | |
| 2003/0031908 A1 | 2/2003 | Bostaph et al. | |
| 2004/0115489 A1 * | 6/2004 | Goel | ........................ 429/26 X |

FOREIGN PATENT DOCUMENTS

| | | |
|---|---|---|
| JP | 2000-195527 | 7/2000 |
| JP | 2000-340247 | 12/2000 |
| JP | 2001-283864 | 10/2001 |
| JP | 2001-338655 | 12/2001 |
| JP | 2003-317736 | 11/2003 |
| WO | WO 9713287 | 4/1997 |
| WO | WO 02/45196 A2 | 6/2002 |
| WO | WO 03/058743 A2 | 7/2003 |

* cited by examiner

*Primary Examiner*—Stephen Kalafut
(74) *Attorney, Agent, or Firm*—Hammer & Associates, P.C.

(57) ABSTRACT

A direct methanol fuel cell has a proton conducting membrane (PCM), a catalyst in contact with the PCM, a gas diffusion layer in contact with the catalyst, and a conducting plate in contact with the gas diffusion membrane. The gas diffusion layer comprises a microporous membrane. The microporous membrane may be a microporous membrane, a laminate of a microporous membrane, and a skinned microporous membrane.

9 Claims, 5 Drawing Sheets

DIRECT METHANOL FUEL CELL

RELATED APPLICATION

This application is a continuation-in-part of U.S. patent application Ser. No. 10/798,032 filed Mar. 11, 2004 now abandoned.

FIELD OF THE INVENTION

The application is directed to a direct methanol fuel cell (DMFC).

BACKGROUND OF THE INVENTION

The direct methanol fuel cell (DMFC) catalytically oxidizes methanol to generate electricity. The DMFC differs from PEM (proton exchange membrane) or solid polymer fuel cells, which use hydrogen gas for generating electricity. One major advantage of the DMFC over the PEM fuel cell is its ability to use methanol, a relatively inexpensive and easily handled material when compared to hydrogen gas. One major disadvantage of the DMFC, when compared to the PEM fuel cell, is methanol crossover. Methanol crossover occurs when methanol from the anode crosses to the cathode. This causes the loss of efficiency of the cell. Nevertheless, the DMFC appears to be a viable portable power source for devices such as cellular or mobile telephones, and handheld or laptop computers. "Types of Fuel Cells," Fuel Cells 2000, www.fuelcells.org; Thomas, et al, "Fuel Cells-Green Power," Los Alamos National Laboratory, LA-VR-99-3231.

The DMFC is an electrochemical device. The anodic catalyzed reaction is:

$CH_3OH + H_2O \rightarrow CO_2 + 6H^+ + 6e^-$

The cathodic catalyzed reaction is:

$3/2\ O_2 + 6H^+ + 6e^- \rightarrow 3H_2O$

The overall cell reaction is:

$CH_3OH + 3/2\ O_2 \rightarrow CO_2 + 2H_2O$

These cells operate at efficiencies of about 40% at temperatures of 50-100° C., the efficiencies will increase at higher operating temperatures. Fuel Cells 2000, Ibid; Thomas, Ibid.

As with any chemical reaction, reactants, products, and unwanted products (by-products) become mixed as the reaction proceeds, and separation of these materials is an engineering challenge. So, at the anode, methanol, water, and carbon dioxide will be mixed together. One must be careful that excess methanol not accumulate at the anode because it will crossover the proton conducting membrane (PCM) and decrease the cell's efficiency. Water is good for the PCM, which needs water to maintain its proton conductivity, but if water accumulates, it can prevent methanol from reaching the catalyst, or it can be recycled back into fuel mixture where it can dilute the fuel. Both can decrease the efficiency of the cell. Carbon dioxide (or $CO_x$s) must be removed to allow room for the fuel at the anode. Otherwise, cell efficiency can suffer.

Likewise, at the cathode, oxygen typically from air, must reach the cathode and water must be removed. If oxygen cannot reach the cathode, efficiency drops because the cathode half cell reaction is impeded. If water, which can be used to moisten the PCM, is allowed to accumulate, it will prevent oxygen from reaching the cathode.

One challenge related to the foregoing is managing the reactant/product issues without greatly increasing the size or weight of the DMFC. DMFC is targeted, in part, at a portable power source for cellular or mobile telephones and handheld or laptop computers.

In WO 02/45196 A2, a DMFC is disclosed. Referring to FIG. 3, the DMFC 40 has proton conducting membrane (PCM) 80 with $CO_2$ conducting elements 52. On the anode side 41, there is a conducting plate 23 that has a flow field 25, a gas diffusion layer 44, and an anodic catalyst 42. On the cathode side 31, there is a conducting plate 33 with a flow field 35, a gas diffusion layer 48, and a cathode catalyst 46. The catalyst, anode or cathode, is applied to either a surface of the PCM 80 or to the gas diffusion layers 44, 48. The respective flow fields are in communication with their respective gas diffusion layers and the combined action of these flow fields and diffusion layers is intended to ensure the even distribution of reactants to the catalyst and the efficient removal of unwanted products, by-products, and unreacted reactants for the reaction. The gas diffusion layers are made of carbon fiber paper and/or carbon fiber cloth and may be "wet-proofed" with PTFE polymer. Note that the gas diffusion layer, catalyst, and PCM are in close contact to promote electrons or protons conductivity.

On the anode side, fuel (methanol, methanol/water in either liquid or vapor form) is introduced at one end of the flow field 25, and by products (water, $CO_2$, and un-reacted fuel) are removed at other end of the flow field 25. $CO_2$ produced at the anode is intended to cross the PCM 80 via $CO_2$ conductors 52. Water produced at the anode is not meant to remain in the gas diffusion layer 42 as is apparent from the use of the PTFE. On the cathode side, air (the source of $O_2$) is introduced at one end of flow field 35, and water, unreacted air, and $CO_2$ are removed at the other end of flow field 35. Water produced at the cathode is not intended to remain in the gas diffusion layer 48 as is apparent from the use of the PTFE.

In U.S. patent application Publication 2002/0192537 A1, another DMFC is disclosed. This DMFC is similar to the foregoing DMFC, except the carbon paper or carbon cloth gas diffusion layers are replaced with a porous metal layer. See paragraphs [0022-0024].

Accordingly, there is a need to improve reactant, product, and by-product management at both the anode and cathode of DMFC while not significantly increasing the size or weight of the DMFC.

SUMMARY OF THE INVENTION

A direct methanol fuel cell has a proton conducting membrane (PCM), a catalyst in contact with the PCM, a gas diffusion layer in contact with the catalyst, and a conducting plate in contact with the gas diffusion membrane. The gas diffusion layer comprises a non-metallic microporous membrane. The non-metallic microporous membrane may be a microporous membrane, a laminate of a microporous membrane, and a skinned microporous membrane.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
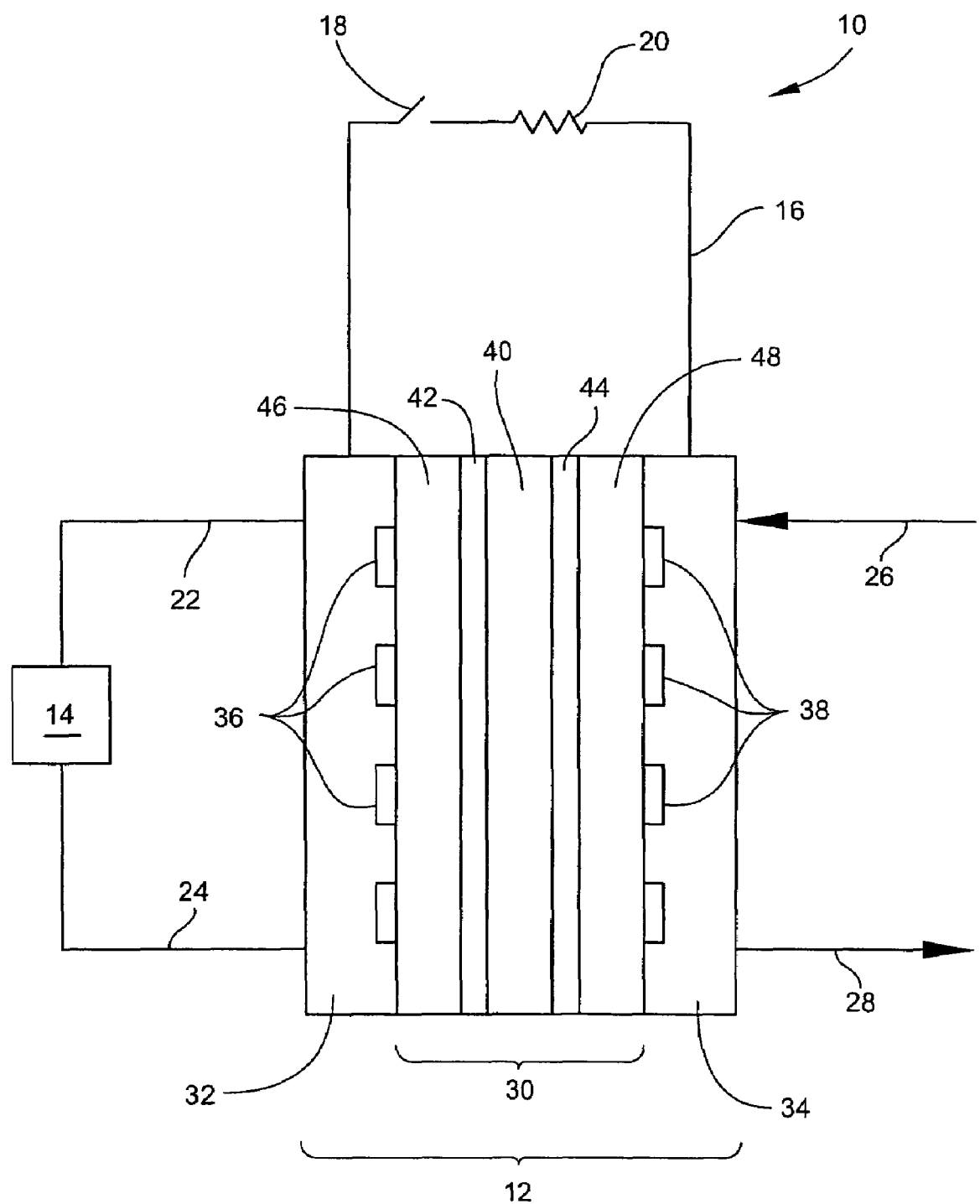
FIG. 1 is a schematic illustration of a direct methanol fuel cell (DMFC) made according to the present invention.

Referring to the drawings, wherein like elements have like numerals, there is shown in FIG. 1 a direct methanol fuel cell system 10.

DMFC system 10 includes a DMFC 12, a fuel source 14, and an electrical circuit 16. DMFC may include one or more DMFC. Fuel source 14 is a storage vessel that contains the fuel, methanol, or a mixture of methanol and water. Electrical circuit 16 includes a switch 18 and a load 20. Load 20 may be any device that requires electricity, such as a cellular or mobile telephone, or a handheld or laptop computer, or the like. Fuel is supplied to DMFC 12 via line 22 from source 14 and is returned to source 14 via line 24 from DMFC 12. Air is supplied to DMFC 12 via line 26 and vented from DMFC 12 via line 28.

DMFC 12 includes a membrane electrode assembly (MEA) 30 preferably sandwiched between a pair of collection plates 32, 34. Collection plates are electrically conductive and are coupled to electrical circuit 16. Collection plate 32 includes a fuel distribution channel 36. One end of channel 36 is in fluid communication with line 22 and the other end of channel 36 is in fluid communication with line 24. Collection plate 34 includes an oxidant distribution channel 38. One end of channel 38 is in fluid communication with line 26 and the other end is in fluid communication with line 28. The geometry of channels 36 and 38 is such that fuel or oxidant is evenly distributed to the catalysts of the DMFC 12.

MEA 30 includes a proton conducting membrane (PCM) 40 with an anode catalyst 42 on one side thereof and a cathode catalyst 44 on the other side thereof and all sandwiched between gas diffusion layers 46 and 48. PCM 40 is conventional, for example NAFION® from DuPont, Wilmington, Del. or the hybrid set forth in WO 02/45196A2, incorporated herein by reference. Anode catalyst 42 may be adhered to a face of PCM 40 or adhered to the fiber surfaces of a carbon fiber mat or cloth. Likewise, cathode catalyst 44 may be adhered to the other face of PCM 40 or adhered to fiber surfaces of a carbon fiber mat or cloth. The anode and cathode catalyst are conventional and the methods of adhering same are also conventional.

The gas diffusion layers 46 and 48 may comprise a non-metallic microporous membrane. Non-metallic microporous membrane, as used herein, includes a microporous membrane, a laminate of a microporous membrane (e.g., one or more membranes, or membranes and coatings), and a skinned microporous membrane. Optionally, the non-metallic microporous membrane may include a fiber substrate, e.g., a carbon fiber substrate. Such membranes may be further characterized as flat sheet membranes having a thickness from 1 to 300 microns.

The non-metallic microporous membrane may take on several different forms, the ultimate form being dependent upon the desired function of the membrane. Functions of the membrane will be dependent upon whether it is located on the anode side or the cathode side. Functions for membranes at the anode side may include, alone or in combination: allowing the fuel to pass to the catalyst; preventing accumulation of water at the catalyst; removal of water from the catalyst, but not to the fuel source; preventing accumulation of MeOH at the catalyst thereby reducing the chance for methanol crossover, allowing MeOH to return to the fuel source; preventing accumulation of $CO_2$ at the catalyst. Functions for membranes at the cathode side may include, alone or in combination: removal of unnecessary water; removal of $CO_2$.

Non-metallic membranes suitable to address these functions include polymeric or ceramic microporous or nonporous membranes, skinned membranes, symmetric or asymmetric membranes, single or multi-layered membranes, and combinations thereof. Such membranes are known, see for example, Kesting, R., *Synthetic Polymeric Membranes*, 2nd Edition, John Wiley & Sons, New York, N.Y. (1985), incorporated herein by reference. Such membranes can be made of various polymers, for example, polyolefins (e.g., polyethylene, polypropylene, poly-3-methylbutene-1, poly-4-methylpentene-1), vinyl polymers (e.g., polystyrene, poly(methyl methacrylate), fluorine-containing polymers (e.g., polyvinylidene, polyvinyltrimethylsilane, fluorovinylethylene/tetrafluoroethylene copolymer), polyamides (e.g., nylon 6, nylon 66, nylon 12), polyesters (e.g., polyester terphthalate, polybutylene terephthalate, polyethylene-2,6-naphthalate), polycarbonates (e.g., poly-4,4'-dihydroxydiphenyl-2,2-propane carbonate), polyethers (e.g., polyoxymethylene, polymethylene sulfide), polyphenylene chalcogenides (e.g., polythioether, polyphenylene oxide, polyphenylene sulfide), polyether ether ketones (PEEK), polysulfone (PS), polyethersulfone (PES), polyimides, polyetherimides (PEI), cellulose acetate (CA), polydimethylsiloxane, blends of the foregoing, compositions including other materials wherein the foregoing polymer comprises a majority of the composition, and copolymers thereof.

Asymmetric membranes include membranes with diameters that vary from one surface to another (e.g., pores with decreasing diameters from one surface of the membranes to the other; pores with decreasing diameters from one surface to a point between the membrane surfaces and increasing diameters to the opposite surface; pores with increasing diameters from one surface to a point between the membrane surfaces and decreasing diameters to the opposite surface).

Skinned microporous membranes include microporous membranes, symmetric or asymmetric, that have at least one "dense" gas separation layer. Typically, this dense layer is located at one or both of the membrane's surfaces, but may be located within the membrane's interior (i.e., between the surfaces). Additionally, the dense layer may be hydrophobic or hydrophilic. The dense layer may be characterized as non-porous, but may include nanopores. The dense layer may have a gas selectivity, i.e., the ability to diffuse one material preferentially over another. Exemplary dense layers may have $O_2/N_2$ gas selectivities of 1.2 or greater or 2.0 or greater. Exemplary dense layers may have $CO_2/N_2$ selectivities of 6.0 or greater or 8.0 or greater.

Additionally, the membranes may have functional coatings/additives, for example, hydrophobic or hydrophilic materials. Such materials are conventional. The membranes may also include perm-selective gels or polymers that preferably pass one or more of the reactants, products, or by-products. Such perm-selective gels or polymers are conventional. Such a perm-selective material could, for example, coat one or more sides of the membrane or be sandwiched between membranes.

As an example of the foregoing, one may use an asymmetric membrane (pores with decreasing diameters from one surface of the membranes to the other) that is coated with a hydrophobic material on the surface with the narrow pores. This membrane, which could be used at either the anode or cathode, would be placed in the MEA with the coated face toward the PCM. Thereby, water, a reactant at the anode and a product at the cathode, and retained around the PCM, is available to moisten the PCM so that its proton conductivity is maintained.

By way of further example of asymmetric membranes reference is made to U.S. Pat. No. 4,664,681 which discusses asymmetric membranes, incorporated herein by reference. Such membranes can be made of various polymers, note the list of polymers set forth above. These membranes are further characterized as having an apparent oxygen permeability coefficient at room temperature (25° C.) that is at least 3 times greater than the apparent oxygen permeability coefficient (@25° C.) for the corresponding homogeneous (symmetrical) membrane, and having an oxygen-nitrogen separation coefficient (@25° C.) of at least 1.2.

Figure 2:
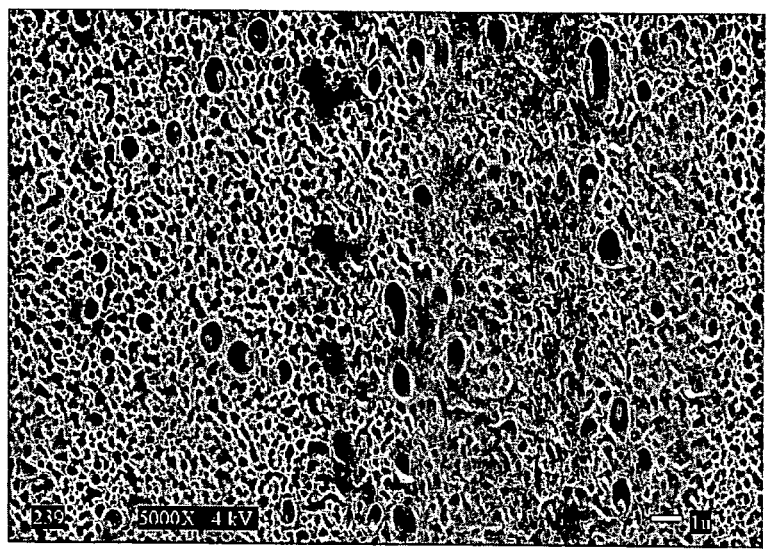
FIG. 2 is a photomicrograph (SEM X5000) of an asymmetric membrane showing the side with the large pores.
Figure 3:
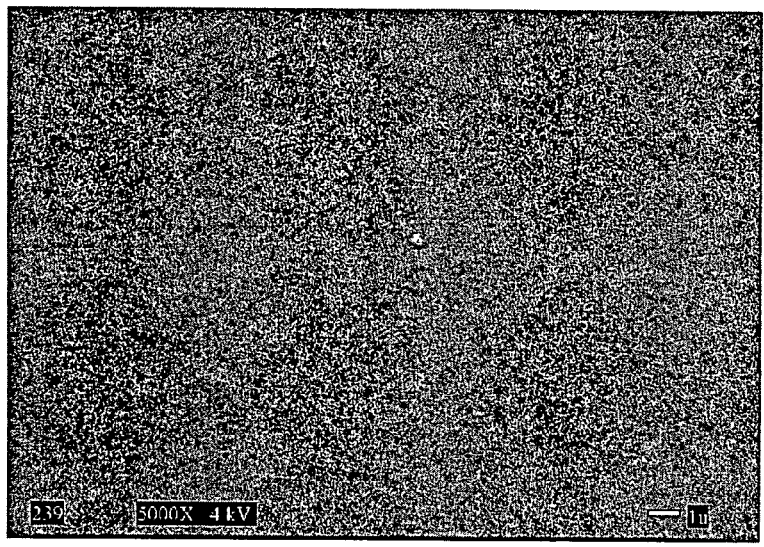
FIG. 3 is a photomicrograph (SEM X5000) of the asymmetric membrane of FIG. 2 showing the side with the small pores.
Figure 4:
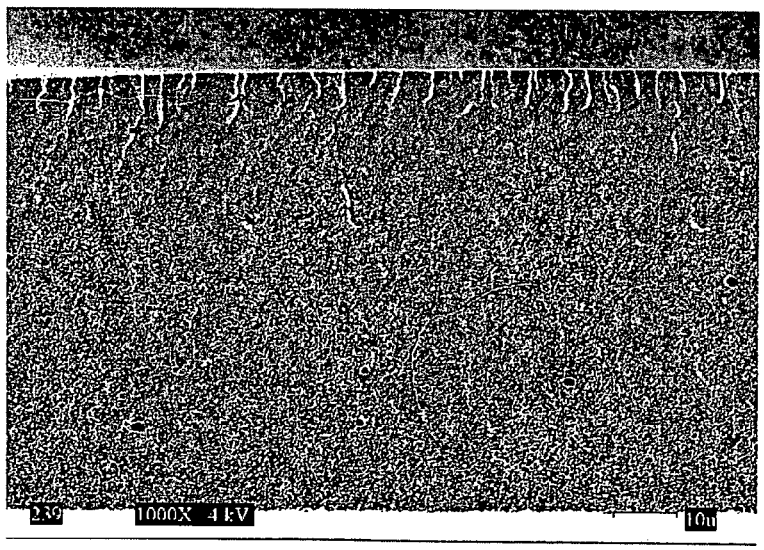
FIG. 4 is a photomicrograph (SEM X1000) of the asymmetric membrane of FIG. 2 showing a cross-sectional view of the membrane.

By way of still further example of asymmetric membranes, reference is made to FIGS. 2, 3, and 4, photomicrographs of a PMP (polymethylpentene) asymmetric membrane. FIGS. 2-4 illustrate an asymmetric membrane having pores that have decreasing diameters from one surface to the other. In FIG. 2, the surface having large pores is illustrated. In FIG. 3, the surface with small pores is illustrated. FIG. 4 is a cross-sectional view of the membrane with the large pore side at the bottom and the small pore side at the top.

Figure 5:
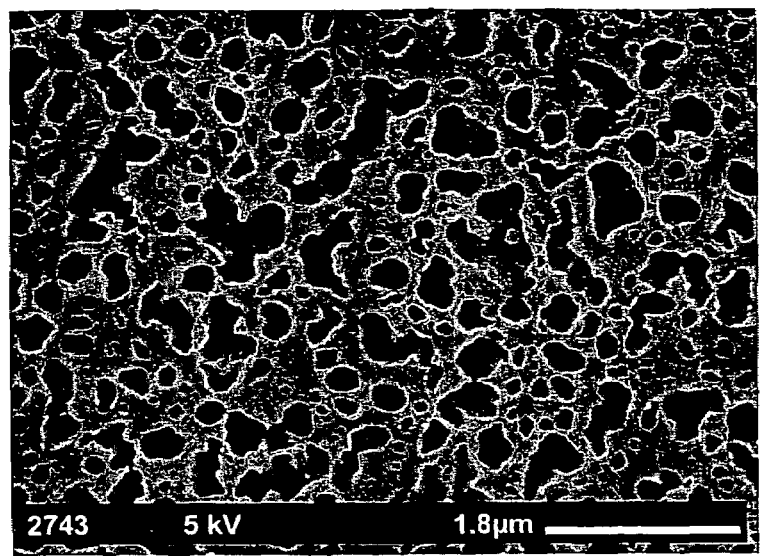
FIG. 5 is a photomicrograph (SEM X15000) of a skinned membrane showing the side with the large pores.
Figure 6:
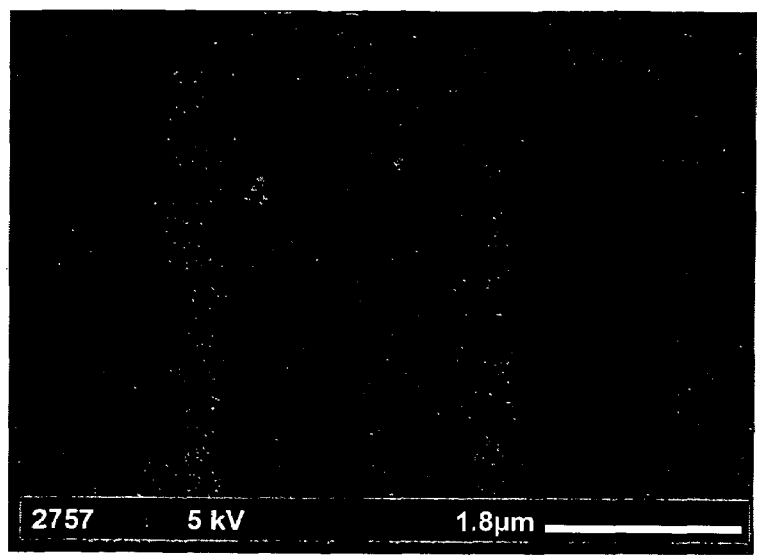
FIG. 6 is a photomicrograph (SEM X15000) of the skinned membrane of FIG. 5 showing the side with the no pores.
Figure 7:
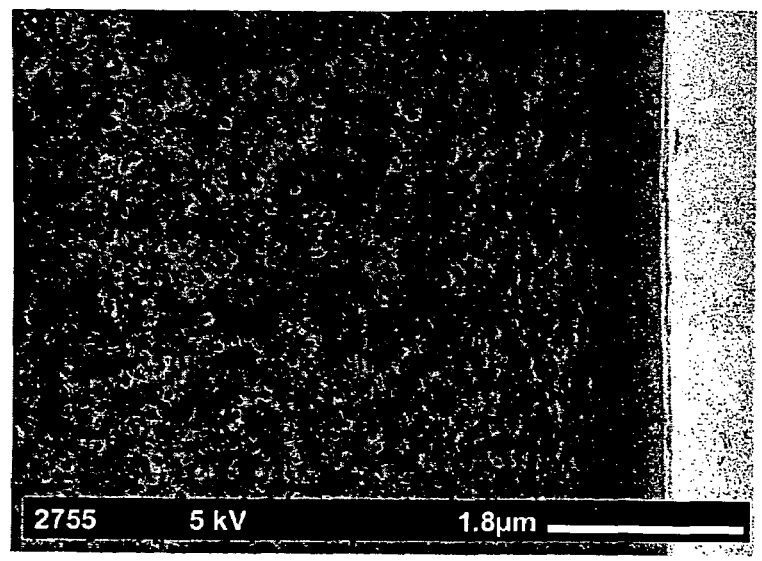
FIG. 7 is a photomicrograph (SEM X15000) of the skinned membrane of FIG. 5 showing a cross-section of the side with no pores.

By way of yet another example of non-metallic microporous membranes, reference is made to FIGS. 5, 6, and 7, photomicrographs of a PMP (polymethylpentene) skinned membrane. FIGS. 5-7 illustrate skinned membrane having pores that have decreasing diameters from one surface to no pores at the other. In FIG. 5, the surface having large pores is illustrated. In FIG. 6, the surface with no pores is illustrated. FIG. 7 is a cross-sectional view of part of the membrane with the dense layer at the right.

Figure 8:
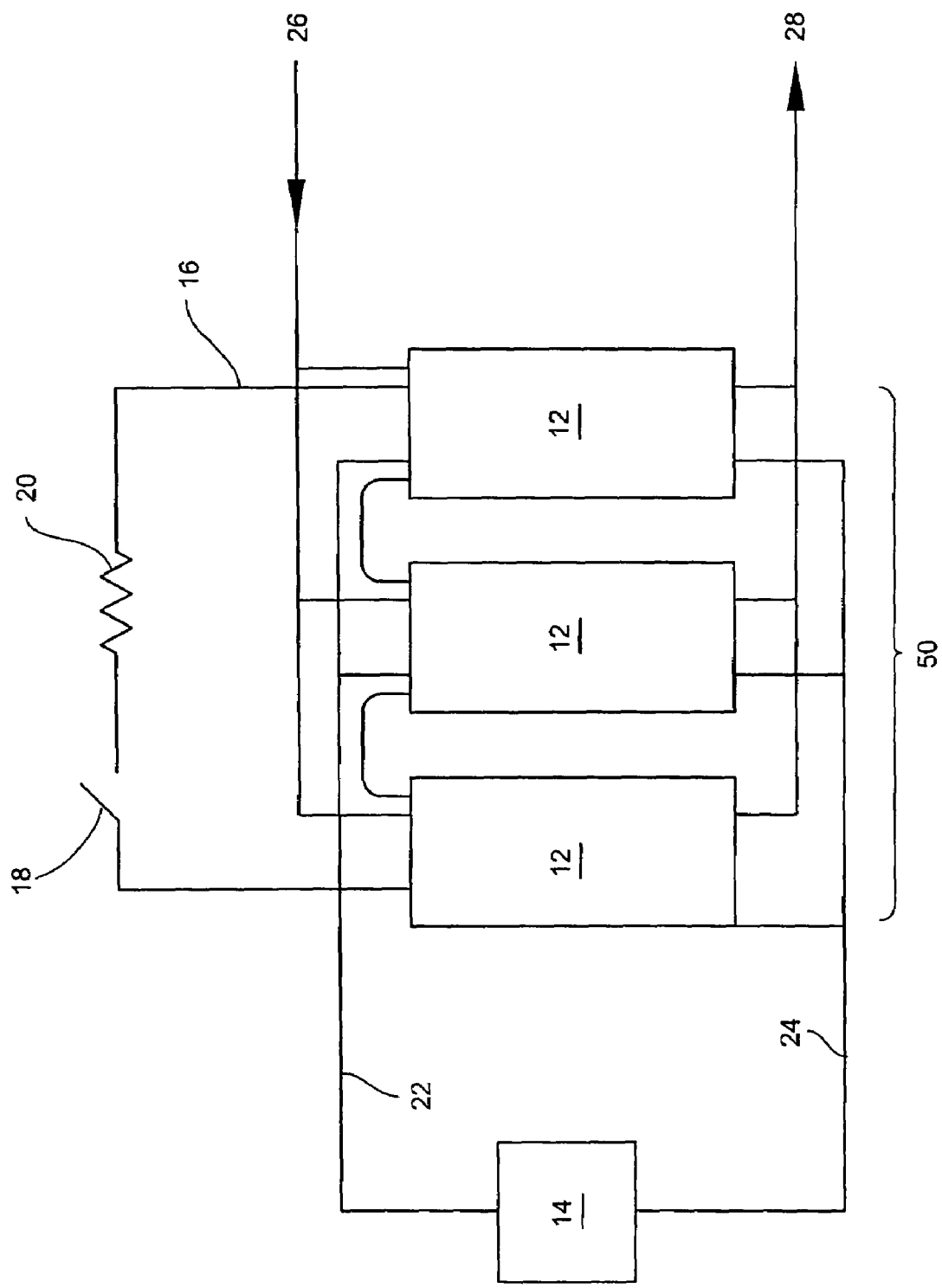
FIG. 8 is a schematic illustration of a plurality of DMFC's connected in series.
Figure 9:
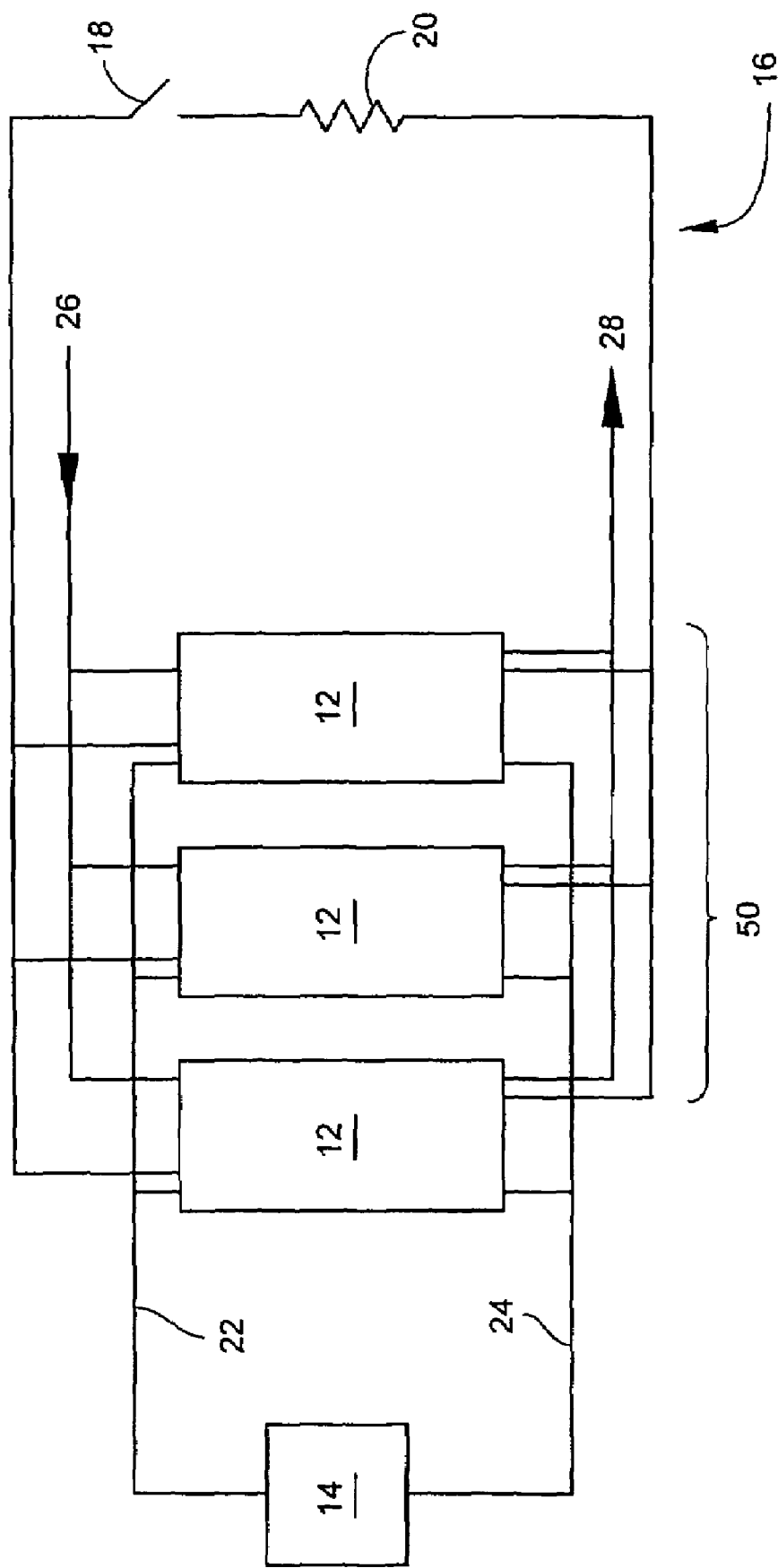
FIG. 9 is a schematic illustration of a plurality of DMFC's connected in parallel.

FIGS. 8 and 9 illustrate further embodiments of the invention. In these embodiments, a plurality of DMFC's are joined together to form a stack 50. In FIG. 8, the DMFC's 12 are joined in series. In FIG. 9, the DMFC's 12 are joined in parallel.

The present invention may be embodied in other forms without departing from the spirit and the essential attributes thereof, and, accordingly, reference should be made to the appended claims, rather than to the foregoing specification, as indicated the scope of the invention.

The invention claimed is:

1. A direct methanol fuel cell comprising
a proton conductive membrane
a catalyst juxtaposed to said proton conductive membrane
a gas diffusion layer juxtaposed to and covering said catalyst, said gas diffusion layer comprising a non-metallic microporous membrane, said non-metallic microporous membrane being a polymeric or ceramic microporous membrane, and said polymeric membrane being made of a polymer selected from the group consisting of polyolefins, vinyl polymers, polyamides, polyesters, polycarbonates, polyethers, polyphenylene chalcogenides, polyether ether ketones, polysulfone, polyethersulfone, polyetherimides, cellulose acetate, polydimethylsiloxane, blends of the foregoing, compositions including other materials wherein the foregoing polymer comprises a majority of the composition, and copolymers thereof
a conducting plate juxtaposed to and covering said gas diffusion layer and having a flow field therein, said flow field being in communication with said gas diffusion layer
whereby a fuel comprising methanol is catalytically converted to electricity by said cell.

2. The cell of claim 1 wherein said gas diffusion layer further comprises a hydrophobic coating next to said catalyst.

3. The cell of claim 1 wherein said non-metallic microporous membrane is a laminate of a microporous membrane.

4. A direct methanol fuel cell comprising
a proton conductive membrane
a catalyst juxtaposed to said proton conductive membrane
a gas diffusion layer juxtaposed to and covering said catalyst, said gas diffusion layer comprising a non-metallic microporous membrane, said non-metallic microporous membrane being an asymmetric membrane
a conducting plate juxtaposed to and covering said gas diffusion layer and having a flow field therein, said flow field being in communication with said gas diffusion layer
whereby a fuel comprising methanol is catalytically converted to electricity by said cell.

5. The cell of claim 4 wherein said pores of said asymmetric membrane has a decreasing diameter across a thickness of said membrane and the narrower diameters are next to said catalyst.

6. A direct methanol fuel cell comprising
a proton conductive membrane
a catalyst juxtaposed to said proton conductive membrane
a gas diffusion layer juxtaposed to and covering said catalyst, said gas diffusion layer comprising a non-metallic microporous membrane, said non-metallic membrane being a skinned membrane
a conducting plate juxtaposed to and covering said gas diffusion layer and having a flow field therein, said flow field being in communication with said gas diffusion layer
whereby a fuel comprising methanol is catalytically converted to electricity by said cell.

7. The cell of claim 6 wherein said skinned membrane has an $O_2/N_2$ selectivity of 1.2 or greater.

8. The cell of claim 6 wherein said skinned membrane has a $CO_2/N_2$ selectivity of 6.0 or greater.

9. A direct methanol fuel cell comprising
a proton conductive membrane
a catalyst juxtaposed to said proton conductive membrane
a gas diffusion layer juxtaposed to and covering said catalyst, said gas diffusion layer comprising a non-metallic microporous membrane said non-metallic microporous membrane comprises a multilayered membrane, wherein one said layer being a thermoplastic microporous membrane and another said layer being a gel perm-selective material
a conducting plate juxtaposed to and covering said gas diffusion layer and having a flow field therein, said flow field being in communication with said gas diffusion layer
whereby a fuel comprising methanol is catalytically converted to electricity by said cell.

* * * * *